United States Patent [19]

Tezuka

[11] Patent Number: 4,734,082

[45] Date of Patent: Mar. 29, 1988

[54] SYSTEM FOR CONTROLLING THE PRESSURE OF OIL IN A SYSTEM FOR CONTINUOUSLY VARIABLE TRANSMISSION

[75] Inventor: Kazunari Tezuka, Asaka, Japan

[73] Assignee: Fuji Jukogyo Kabushiki Kaisha, Tokyo, Japan

[21] Appl. No.: 928,984

[22] Filed: Nov. 10, 1986

[30] Foreign Application Priority Data

Nov. 18, 1985 [JP] Japan .................................. 60-258138

[51] Int. Cl.⁴ .............................................. F16H 11/04
[52] U.S. Cl. ........................................ 474/28; 474/18; 74/867
[58] Field of Search ................. 474/28, 69, 70, 16–18; 74/856, 865, 867

[56] References Cited

U.S. PATENT DOCUMENTS

| | | | |
|---|---|---|---|
| 4,369,675 | 1/1983 | van Deursen | 474/28 X |
| 4,458,318 | 7/1984 | Smit et al. | 474/28 X |
| 4,459,879 | 7/1984 | Miki et al. | 474/28 X |
| 4,601,680 | 7/1986 | Tokoro et al. | 474/28 X |

FOREIGN PATENT DOCUMENTS 58-191361  11/1983  Japan .

*Primary Examiner*—Stephen J. Novosad
*Assistant Examiner*—Thuy M. Bui
*Attorney, Agent, or Firm*—Martin A. Farber

[57] ABSTRACT

A control system for a motor vehicle provided with a continuously variable transmission. The transmission has a line pressure control valve having ports and a spool for controlling the line pressure of oil supplied to a cylinder of a pulley device to change the transmission ratio. When torque of an engine is rapidly increased, the line pressure is increased so as to prevent a belt of the pulley device from slipping.

8 Claims, 6 Drawing Figures

SYSTEM FOR CONTROLLING THE PRESSURE OF OIL IN A SYSTEM FOR CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling line pressure in a hydraulic circuit for the transmission.

A known control system for a continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump, a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine torque. The line pressure is controlled to prevent the belt from slipping on the pulleys in order to transmit the output of the engine. However, the control operation for the line pressure is liable to delay at a transient state of the driving condition of the vehicle, where engine torque and transmission ratio change rapidly.

Japanese Patent Laid Open 58-191361 discloses a control system for controlling the line pressure in the transient state of the driving condition of a vehicle. In the control system, the difference between an actual speed of an engine and a desired speed or the difference between an actual transmission ratio and a desired transmission ratio is detected. A rapid change in transient state is detected by the fact of a larger difference than a predetermined value. At the rapid change, line pressure is increased for a period. Although the system responds to the change of the transmission ratio without large delay, the system does not quickly respond to the change of engine torque.

Generally, the transmission ratio is decided by opening degree of a throttle valve and speed of a vehicle. Since the vehicle speed does not quickly change, a rapid change of transmission ratio can be preliminarily detected by rapid change of the opening degree of the throttle valve. On the other hand, the engine torque is decided by engine speed and opening degree of the throttle valve. When the transmission ratio is constant, the engine speed is proportional to the vehicle speed and does not immediately change. Accordingly, rapid change of engine torque can also be detected by rapid change of the opening degree of the throttle valve.

SUMMARY OF THE INVENTION

Accordingly, the object of the present invention is to provide a system which may preliminarily detect rapid changes of engine torque and transmission ratio by change of the opening degree of a throttle valve, and control the line pressure so as to prevent a belt from slipping on the pulleys.

According to the present invention, there is provided a control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a line pressure control valve having ports and a spool, a transmission ratio control valve having ports and a spool, a first hydraulic circuit having a pump for supplying oil to the first and second cylinders.

The system comprises a second hydraulic circuit for supplying the oil to the line pressure control valve so as to shift the spool, control valve means provided in the second hydraulic circuit for controlling the amount of the oil supplied to the line pressure control valve, first means for detecting opening degree of a throttle valve of said engine and for producing a first signal, second means responsive to the first signal for producing a second signal representing rate of changing of throttle opening degree, third means responsive to the second signal for detecting a rapid acceleration exceeding a predetermined magnitude and for producing a third signal, fourth means responsive to the third signal for controlling said control valve means to increase the line pressure for a predetermined time so as to prevent slipping of the belt at the rapid acceleration.

The other objects and features of this invention will become understood from the following description with reference to the accompanying drawings.

DETAILED DESCRIPTION OF THE PREFERRED EMBODIMENT

Figure 1:
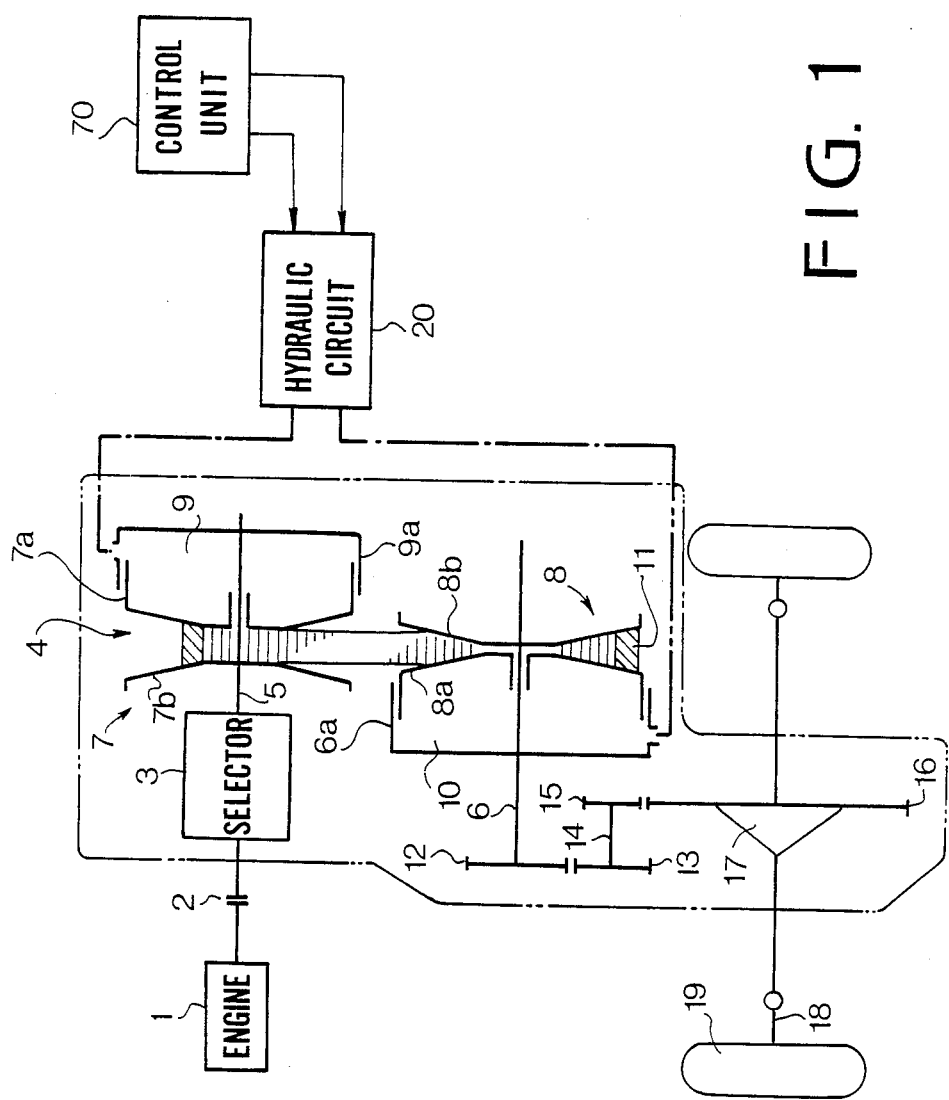
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
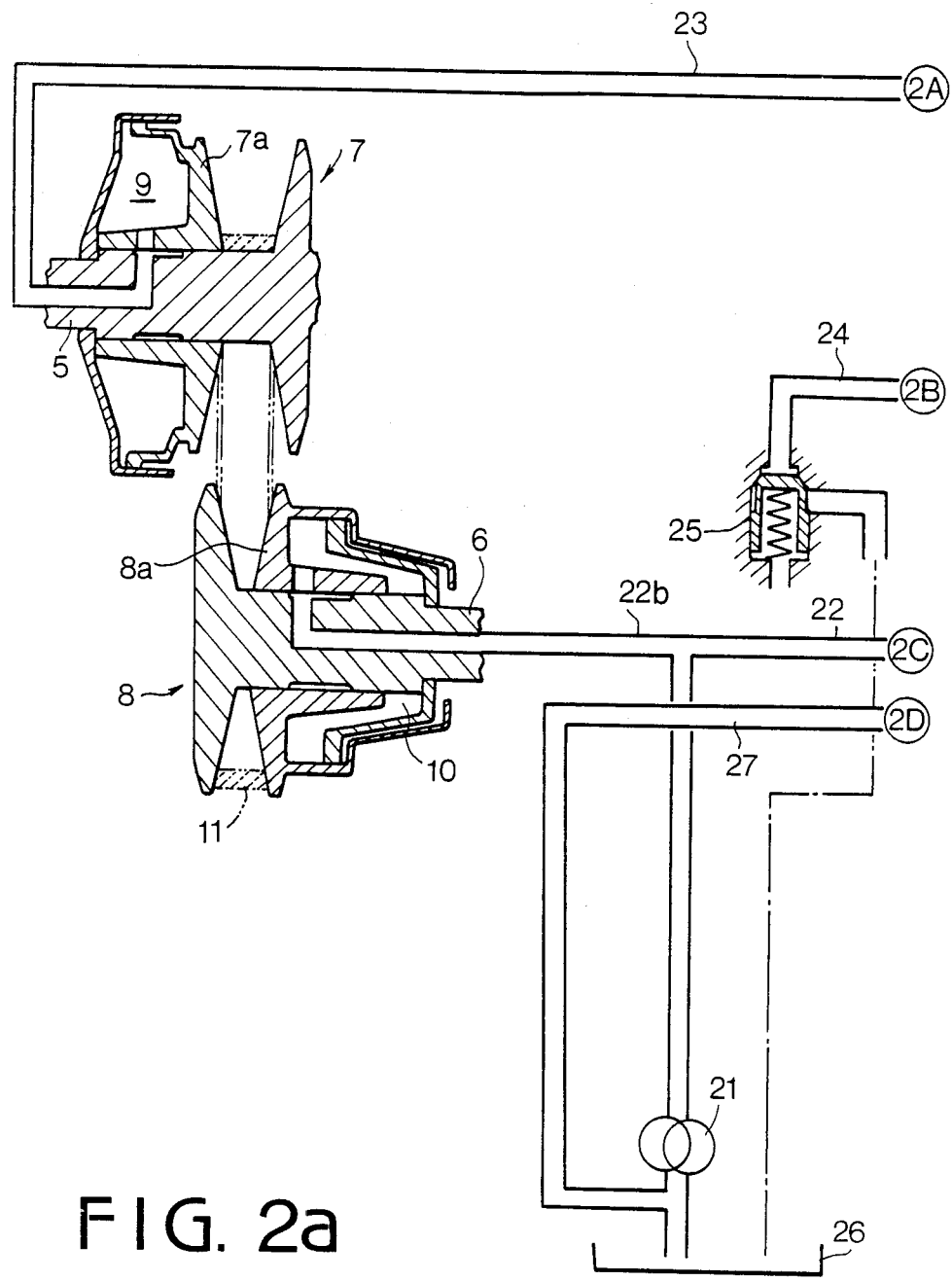
FIGS. 2a and 2b are schematic diagrams showing a control system according to the present invention.
Figure 2B:
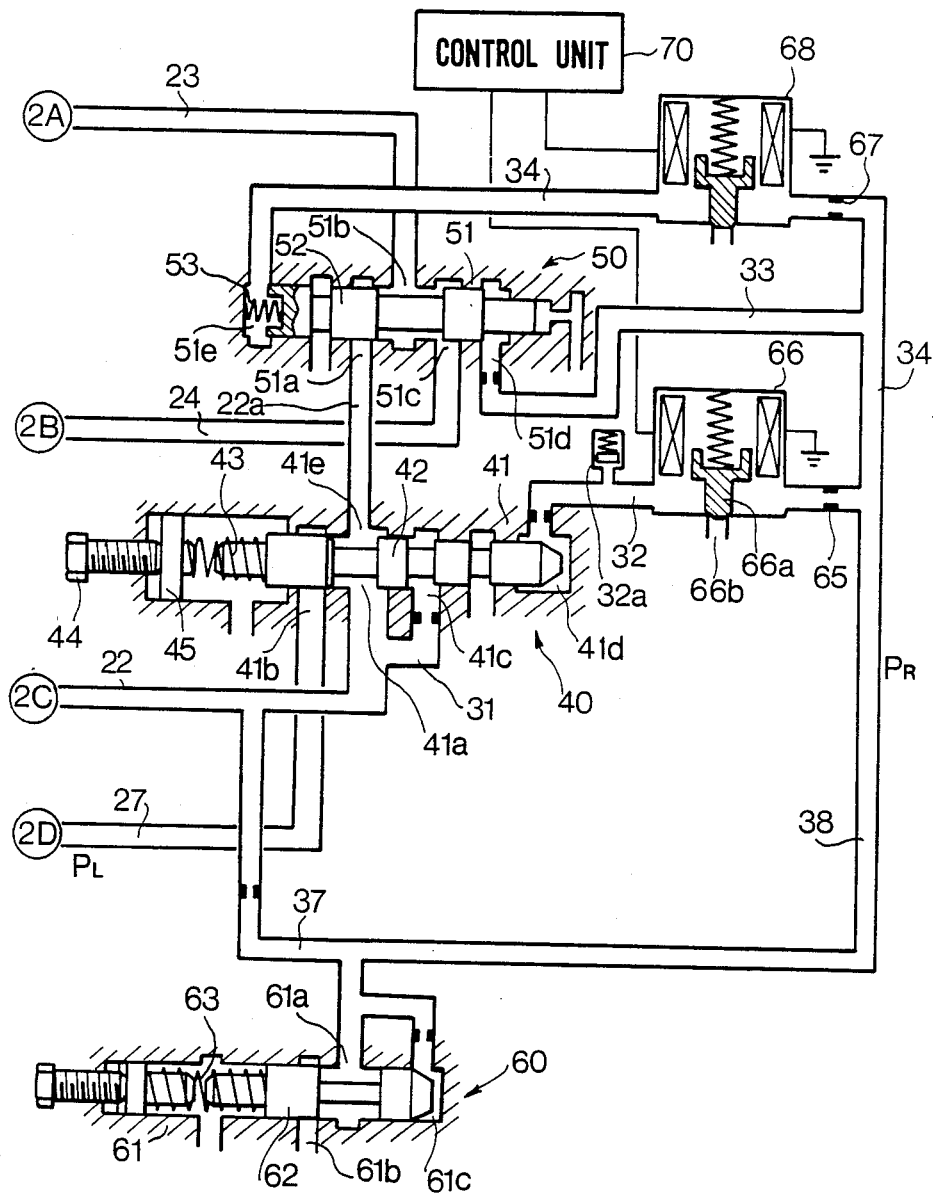

Referring to FIGS. 2a and 2b, chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45 the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, spring 53 for urging the spool 52 in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through conduit 22a. The drain port 51c is communicated with the oil reservoir 26 through a conduit 24 and a check valve 25.

The system is provided with a regulator valve 60, and solenoid operated on-off control valves 66 and 68.

The regulator valve 60 comprises a valve body 61, inlet port 61a connected to the pump 21 through passages 37 and 22, spool 62, end chamber 61c connected to the passage 37, spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through a passage 34, orifice 67, and solenoid operated on-off valve 68. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The control valves 66 and 68 are operated by signals from a control unit 70. Thus, pressure controlled by the control valves 66 and 68 is applied to chambers 41d and 51e.

In the transmission ratio control valve 50, pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the control valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

Figure 3A:
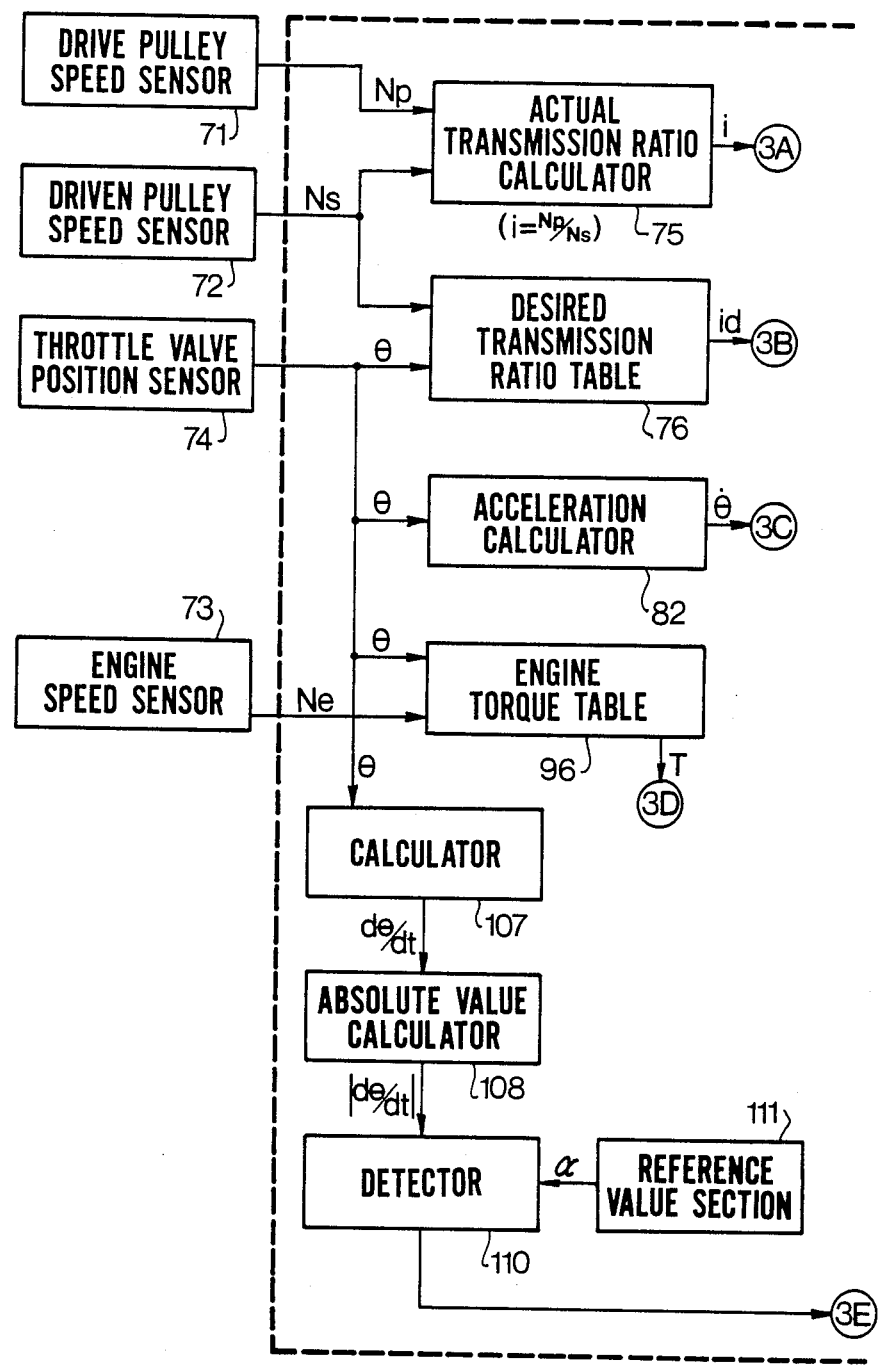
FIGS. 3a and 3b are block diagrams showing a control unit.
Figure 3B:
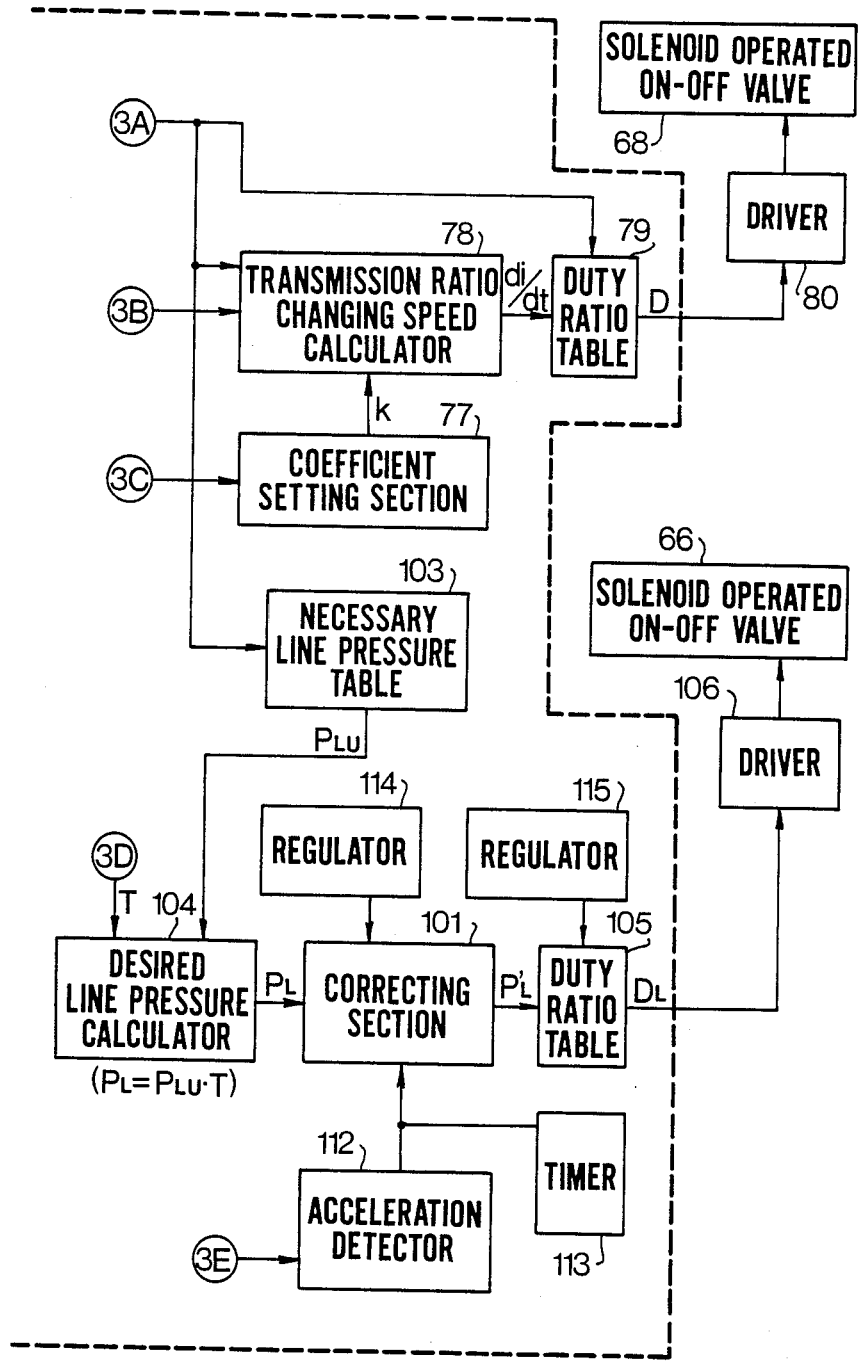

Referring to FIGS. 3a and 3b, a drive pulley speed sensor 71, driven pulley speed sensor 72, engine speed sensor 73 and throttle valve position sensor 74 are provided. Output signals $N_p$ and $N_s$ of sensors 71, 72 are fed to an actual transmission ratio calculator 75 to produce an actual transmission ratio i in accordance with $i = N_p/N_s$. Output signal $N_s$ and output signal $\theta$ of the throttle valve position sensor 74 are fed to a desired transmission ratio table 76. The desired transmission ratio id is fetched from the table 76 in accordance with the signals $N_s$ and $\theta$. On the other hand, the output $\theta$ is fed to an acceleration calculator 82 to obtain acceleration $\dot{\theta}$. The signal of the acceleration $\dot{\theta}$ is supplied to a coefficient setting section 77 to produce a coefficient K. The actual transmission ratio i, desired transmission ratio id and coefficient K from the coefficient setting section 77 are applied to a transmission ratio changing speed calculator 78 to produce a transmission ratio changing speed di/dt from the formula $di/dt = K(id - i)$.

The speed di/dt and actual ratio i are applied to a duty ratio table 79 to derive the duty ratio D. The duty ratio D is supplied to the solenoid operated valve 68 through a driver 80.

On the other hand, the output signal $\theta$ of throttle position sensor 74 and the output $N_e$ of engine speed sensor 73 are fed to an engine torque calculator 96, so that engine torque T is calculated based on throttle position $\theta$ and engine speed $N_e$.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 which calculates a desired line pressure $P_L$.

The desired line pressure $P_L$ is applied to a duty ratio table 105 through a correcting section 101 to derive a duty ratio $D_L$ corresponding to a corrected line pressure $P_L'$. The duty ratio $D_L$ is supplied to a driver 106 which operates the solenoid operated on-off valve 66 at the duty ratio.

Further, the signal $\theta$ from the throttle valve position sensor 74 is applied to a calculator 107 for calculating the throttle opening degree changing rate $d\theta/dt$. The output $d\theta/dt$ of the calculator 107 is converted to an absolute value $|d\theta/dt|$ at an absolute value calculator 108. The absolute value is compared with a reference value α from a reference value section 111 at a detector 110 for detecting rapid changes of engine torque and transmission ratio. When the absolute valve is larger than the reference value ($|d\theta/dt| > \alpha$), the detector 110 produces an output signal dependent on the rate $d\theta/dt$. The output signal is applied to an acceleration detector 112 which produces a correct signal when $d\theta/dt$ is larger than zero ($d\theta/dt > 0$). The correct signal is applied to the correcting section 101 for a predetermined time t set by a timer 113, so that the desired line pressure is increased. The raised line pressure is gradually reduced by a lowering signal from a line pressure lowering speed regulator 114 or by a signal from a duty ratio changing speed regulator 115.

In operation, while the vehicle is at a stop, chamber 10 of the driven pulley 8 is supplied with line pressure through passage 22b and the chamber 9 of the drive pulley 7 is drained, since the $N_p$, $N_s$, $\theta$ are zero and duty ratio D is zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed, so that the electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles of the driving wheels 19. Thus, the vehicle is started.

At that time the line pressure is at the highest value by the pressure control valve 40, since the duty ratio for the valve 66 is large, and the spool 42 of the control valve 40 is at the right end position. When the throttle valve is opened for acceleration, the desired transmission ratio id and transmission ratio changing speed di/dt are calculated by calculators 76, 78, and duty ratio D is obtained from the table 79. The value of the duty ratio D is larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23. On the other hand, duty ratio for the control valve 66 is reduced, thereby shifting the spool 42 of the valve 40 to the left. The port 41a communicates with the port 41b of the drain passage 27. Thus, line pressure reduces, and the transmission is upshifted, since oil is still supplied to the chamber 9 through the control valve 50.

The control operation of line pressure will be described hereinafter with reference to FIGS. 2a, 2b, 3a, 3b, and 4. From the engine torque table 96, the engine torque T is obtained in accordance with throttle position $\theta$ and engine speed $N_e$, which is applied to desired line pressure calculator 104. The calculator 104 calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

Figure 4:
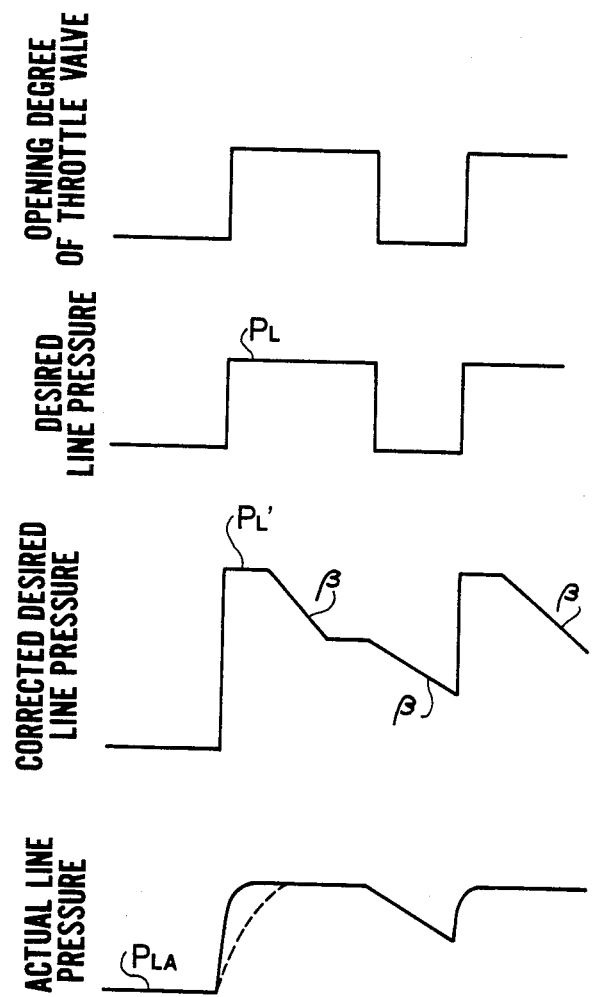
FIG. 4 is waveforms at various portions of the system.

When the throttle valve is rapidly opened and the magnitude of the throttle opening degree changing rate $d\theta/dt$ is larger than the reference value α, the detector 110 produces an output signal. The output signal is applied to acceleration detector 112 which produces the correct signal. The correct signal is applied to the correcting section 101 for predetermined time t set by a timer 113, so that the desired line pressure is increased to $P_L'$ as shown in FIG. 4. In accordance with the raised desired line pressure the duty ratio $D_L$ is changed and the line pressure $P_{LA}$ is quickly increased as shown by solid line in FIG. 4 at a higher rate than an ordinary rate (shown by a chain line) by the desired line pressure PL'.

Thus, the line pressure is quickly increased in accordance with the rapid opening of the throttle valve before engine torque actually increases. Accordingly, the belt 11 is prevented from slipping on the pulleys, even if the engine torque rapidly increases. Thereafter, the desired line pressure is gradually reduced by the lowering signal from line pressure lowering speed regulator 114 at rates β shown in FIG. 4. Thus, the line pressure gradually decreases. Instead of the regulator 114, the duty ratio changing speed regulator 115 may gradually reduce the line pressure.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a continuously variable transmission for transmitting the power of an internal combustion engine having a throttle valve to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system having a line pressure control valve having ports and a shiftable spool, a transmission ratio control valve having ports and a shiftable spool, a first hydraulic circuit having a pump for supplying oil regulated by the line pressure control valve via said line pressure control valve to the first hydraulic cylinder and to said second hydraulic cylinder, the improvement in the system comprising:

a second hydraulic circuit for supplying the oil to adjacent an end of the line pressure control valve so as to shift the spool of the line pressure control valve;

control valve means provided in the second hydraulic circuit for controlling the amount of the oil supplied to adjacent the end of the line pressure control valve;

first means for detecting opening degree of said throttle valve of said engine and for producing a first signal dependent on said opening degree;

second means responsive to the first signal for producing a second signal representing changing rate of throttle opening degree;

third means responsive to the second signal exceeding a predetermined magnitude for detecting a potential rapid acceleration for producing a third signal;

fourth means responsive to the third signal for controlling said control valve means to increase the line pressure for a predetermined time so as to prevent slipping of the belt at the rapid acceleration.

2. The control system according to claim 1 wherein the control valve means is a solenoid operated on-off valve.

3. The control system according to claim 1 wherein the second hydraulic circuit is provided with a regulator valve for maintaining the pressure of the oil in said second hydraulic circuit at a constant value.

4. The control system according to claim 1 further comprising fifth means for gradually reducing the increased line pressure.

5. The control system according to claim 4, wherein said fifth means is a regulator.

6. The control system according to claim 5, wherein said regulator is a duty ratio changing speed regulator.

7. The control system according to claim 5, wherein said third signal is dependent on said changing rate of throttle opening degree.

8. The control system according to claim 5, further comprising
an absolute value calculator connected between said second means and said third means for providing the magnitude of said changing rate of throttle opening degree.

* * * * *